US010793691B2

(12) United States Patent
Glew et al.

(10) Patent No.: US 10,793,691 B2
(45) Date of Patent: Oct. 6, 2020

(54) FOAMABLE COMPOSITIONS AND METHODS FOR FABRICATING FOAMED ARTICLES (71) Applicant: CABLE COMPONENTS GROUP, LLC, Pawcatuck, CT (US)

(72) Inventors: Charles A. Glew, Charlestown, RI (US); Nicolas M. Rosa, Westerly, RI (US); Charles M. Glew, Charlestown, RI (US)

(73) Assignee: Cable Components Group, LLC, Pawcatuck, CT (US)

(*) Notice: Subject to any disclaimer, the term of this patent is extended or adjusted under 35 U.S.C. 154(b) by 0 days.

(21) Appl. No.: 16/207,753

(22) Filed: Dec. 3, 2018

(65) Prior Publication Data
US 2019/0169391 A1 Jun. 6, 2019

Related U.S. Application Data (60) Provisional application No. 62/593,674, filed on Dec. 1, 2017.

(51) Int. Cl.
B29C 44/12 (2006.01)
C08F 214/26 (2006.01)
(Continued)

(52) U.S. Cl.
CPC ............ C08J 9/0061 (2013.01); B29C 44/12 (2013.01); C08F 214/26 (2013.01);
(Continued)

(58) Field of Classification Search
CPC ............... B29C 44/12; B29K 2503/08; B29K 2705/10; B29L 2011/0075;
(Continued)

(56) References Cited

U.S. PATENT DOCUMENTS 5,225,107 A * 7/1993 Kretzschmann ....... C08J 9/0023
516/11
5,834,024 A * 11/1998 Heinicke .............. A61K 9/5078
424/497
(Continued)

FOREIGN PATENT DOCUMENTS

CN 106009258 A * 10/2016
CN 106009258 A 10/2016
(Continued)

OTHER PUBLICATIONS

Experiment tube based equation for polymer_Valette et al._pp. 79-84_2013.*
(Continued)

Primary Examiner — Timothy J Thompson
Assistant Examiner — Guillermo J Egoavil
(74) Attorney, Agent, or Firm — Levenfeld Pearlstein, LLC (57) ABSTRACT In one aspect, a foamable composition is disclosed, which comprises a base polymer, talc and a citrate compound blended with the base polymer. In some embodiments, the concentration of the talc in the composition is in a range of about 0.05% to about 25% by weight, e.g., in a range of about 2% to about 20%, or in a range of about 3% to about 15%, or in a range of about 5% to about 10%. Further, the concentration of the citrate compound in the composition can be, for example, in a range of about 0.05% to about 3% by weight, or in a range of about 0.02% to about 0.9% by weight, or in a range of about 0.03% to about 0.8% by weight, or in a range of about 0.04% to about 0.7% by weight, or in a range of about 0.05% to about 0.6% by weight.

19 Claims, 9 Drawing Sheets (51) Int. Cl.
| | |
|---|---|
| C08F 214/28 | (2006.01) |
| C08J 9/00 | (2006.01) |
| C08J 9/06 | (2006.01) |
| C08K 5/098 | (2006.01) |
| C08L 27/18 | (2006.01) |
| C08L 27/20 | (2006.01) |
| G02B 6/44 | (2006.01) |
| H01B 11/04 | (2006.01) |
| H01B 11/22 | (2006.01) |
| H01B 13/00 | (2006.01) |
| H01B 13/14 | (2006.01) |
| H01B 3/44 | (2006.01) |
| C08K 3/34 | (2006.01) |
| C08J 9/08 | (2006.01) |
| C08J 9/16 | (2006.01) |
| B29K 503/08 | (2006.01) |
| B29K 705/10 | (2006.01) |
| B29L 11/00 | (2006.01) |
| B29L 31/34 | (2006.01) |

(52) U.S. Cl.
CPC .......... *C08F 214/28* (2013.01); *C08J 9/0023* (2013.01); *C08J 9/0066* (2013.01); *C08J 9/06* (2013.01); *C08J 9/08* (2013.01); *C08J 9/16* (2013.01); *C08K 3/346* (2013.01); *C08K 5/098* (2013.01); *C08L 27/18* (2013.01); *C08L 27/20* (2013.01); *G02B 6/443* (2013.01); *G02B 6/4486* (2013.01); *H01B 3/441* (2013.01); *H01B 3/445* (2013.01); *H01B 11/04* (2013.01); *H01B 11/22* (2013.01); *H01B 13/0016* (2013.01); *H01B 13/148* (2013.01); B29K 2503/08 (2013.01); B29K 2705/10 (2013.01); B29L 2011/0075 (2013.01); B29L 2031/3462 (2013.01); C08J 9/0095 (2013.01); C08J 2201/03 (2013.01); C08J 2203/02 (2013.01); C08J 2203/10 (2013.01); C08J 2205/05 (2013.01); C08J 2205/052 (2013.01); C08J 2207/00 (2013.01); C08J 2327/12 (2013.01); C08J 2327/18 (2013.01); C08J 2327/20 (2013.01); C08J 2427/18 (2013.01); C08J 2491/06 (2013.01); C08L 2203/14 (2013.01); C08L 2203/202 (2013.01); C08L 2205/025 (2013.01); C08L 2205/03 (2013.01)

(58) Field of Classification Search
CPC .......... B29L 2031/3462; C08F 214/26; C08F 214/28; C08K 3/346; C08K 5/098; G02B 6/44; G02B 6/443; G02B 6/4486; H01B 11/04; H01B 11/22; H01B 3/44; H01B 3/445; H01B 3/441; H01B 13/00; H01B 13/14; H01B 13/0016; H01B 13/148; C08J 2201/03; C08J 2203/02; C08J 2203/10; C08J 2205/05; C08J 2205/052; C08J 2207/00; C08J 2327/12; C08J 2327/18; C08J 2327/20; C08J 2427/18; C08J 2491/06; C08J 9/00; C08J 9/0023; C08J 9/0061; C08J 9/0066; C08J 9/06; C08J 9/08; C08J 9/16; C08J 9/0095; C08L 2203/14; C08L 2203/202; C08L 2205/025; C08L 2205/03; C08L 27/18; C08L 27/20

USPC .......... 174/70 R; 252/350; 428/373; 521/91, 521/92

See application file for complete search history.

(56) References Cited

U.S. PATENT DOCUMENTS

| | | | | |
|---|---|---|---|---|
| 8,948,560 | B1 * | 2/2015 | Wach | G02B 6/032 385/115 |
| 10,526,466 | B2 * | 1/2020 | Glew | H01B 3/445 |
| 2002/0079121 | A1 * | 6/2002 | Ryan | B29C 66/472 174/68.1 |
| 2003/0141297 | A1 * | 7/2003 | McCarthy | B65D 1/34 219/725 |
| 2006/0115539 | A1 * | 6/2006 | Prasch | A61K 31/7048 424/490 |
| 2007/0232763 | A1 * | 10/2007 | Kulkarni | C08L 67/02 525/437 |
| 2008/0020018 | A1 * | 1/2008 | Moodley | A61K 31/4725 424/433 |
| 2010/0063214 | A1 * | 3/2010 | Kasahara | B01J 19/0013 525/326.4 |
| 2010/0151243 | A1 * | 6/2010 | Glew | C08J 9/0066 428/373 |
| 2017/0304196 | A1 * | 10/2017 | Okada | A61K 31/5383 |
| 2017/0314171 | A1 * | 11/2017 | Abubakar | D01F 6/30 |
| 2018/0257361 | A1 * | 9/2018 | Bissinger | C09D 127/18 |
| 2019/0276625 | A1 * | 9/2019 | Glew | G02B 6/4486 |

FOREIGN PATENT DOCUMENTS

| | | | | |
|---|---|---|---|---|
| CN | 106146944 | A * | 11/2016 | ................ C08L 9/02 |
| CN | 106009258 | A * | 12/2016 | |

OTHER PUBLICATIONS

Efficiency of Nucleating Agents_Mudra et al._pages 355-361_Jun. 1997.*
Honeywell A-C-Product-Summary_pp. 1-2_Jun. 2009.*
Perspective-Iononner-Research-and-Applications_Zhang et al._pages 81-99_Feb. 2014.*
International Search Report issued by ISA/EPO in connection with PCT/US2018/063604 dated Jun. 4, 2019.

* cited by examiner

FIG. 1

Heat a composition comprising a base polymer, talc and a citrate compound to a temperature sufficient to cause decomposition of at least talc in the composition Extrude the heated composition to form a foamed article

FOAMABLE COMPOSITIONS AND METHODS FOR FABRICATING FOAMED ARTICLES

BACKGROUND

The present invention relates generally to foamable compositions, methods for processing such compositions to fabricate foamed articles, and foamed articles that can be fabricated using such foamable compositions.

A broad range of cables are installed in modern buildings for a wide variety of uses. Such uses include, among others, data transmission between computers, voice communications, video communications, power transmission over communications cables, e.g., power over Ethernet (PoE), as well as control signal transmission for building security, fire alarm, and temperature control systems. As the data transmission rates increase, so do the requirements for such cables to exhibit low cross-talk, including alien cross-talk. Further, in many applications, the cables must adhere to stringent requirements regarding flammability.

Thus, there is a need for compositions and processing methods for forming various components of communications cables.

SUMMARY

In one aspect, a foamable composition is disclosed, which comprises a base polymer, talc blended with said base polymer, and a citrate compound blended with said base polymer. In some embodiments, the concentration of the talc in the composition is in a range of about 0.3% to about 30% by weight, e.g., in a range of about 1% to about 25%, or in a range of about 2% to about 20%, or in a range of about 5% to about 10%. Further, the concentration of the citrate compound in the composition can be, for example, in a range of about 0.01% to about 1% by weight, or in a range of about 0.02% to about 0.9% by weight, or in a range of about 0.03% to about 0.8% by weight, or in a range of about 0.04% to about 0.7% by weight, or in a range of about 0.05% to about 0.6% by weight. Any of these concentrations of the citrate compound can be used with any of the concentrations of talc discussed above.

Further, in some embodiments, the weight concentration of the base polymer can be, for example, in a range of about 50% to about 98.5%, e.g., in a range of about 60% to about 95%, or, in a range of about 65% to about 90%, or in a range of about 70% to about 80%. Any of these concentrations of the base polymer can be used with any of the above concentrations of talc and/or the citrate compound.

A variety of base polymers can be employed in a composition according to the present teachings. By way of example, in some embodiments, the base polymer can be a fluoropolymer. For example, in some embodiments, the fluoropolymer can be a perfluoropolymer. In some embodiments, the base polymer can be an engineered resin. Some examples of suitable base polymers include, without limitation, any of tetrafluoroethylene/perfluoromethylvinyl ether copolymer (MFA), hexafluoropropylene/tetrafluoroethylene copolymer (FEP), perfluoroalkoxy (PFA), and perfluoroalkoxyalkane, and combinations thereof. Further, in some embodiments, the polymer can be, without limitation, any of polyphenylenesulfide (PPS), polyetherimide (PSU), polyphenylsulfone (PPSU), polyethersulfone (PES/PESU), polyetheretherketone (PEEK), polyaryletherketone (PAEK), polyetherketoneketone (PEKK), polyetherketone (PEK), and combinations thereof.

In some embodiments, the citrate compound can be a citrate salt. Some examples of suitable citrate salts include, without limitation, calcium citrate, potassium citrate, zinc citrate and a combination thereof.

In some embodiments, the composition can be in the form of a plurality of pellets.

In some embodiments, a foamable composition according to the present teachings can include a base polymer, such as the polymers listed above, talc and a citrate compound (e.g., a citrate salt) blended with the base polymer as well as a nucleating agent blended with the base polymer. Some examples of suitable nucleating agents include, without limitation, PTFE (polytetrafluoroethylene), boron nitride, zinc oxide, and/or $TiO_2$. In some such embodiments, the concentration of the talc and the citrate compound can be those listed above, and the concentration of the nucleating agent can be, for example, in a range of about 0.3% to about 5% by weight.

Further, in some embodiments, in addition to talc and a citrate compound (and optionally a nucleating agent), a synthetic wax that is a low molecular weight ionomer, such as Aclyn wax can be optionally added to the foamable composition, e.g., to enhance the surface finish properties of the composition.

In a related aspect, a process for fabricating a foamed article is disclosed, which comprises heating a composition, which can be, for example, in the form of a plurality of pellets, comprising a base polymer, talc blended with said base polymer, and a citrate compound blended with said base polymer to a temperature sufficient to cause decomposition of talc so as to generate a gas for foaming the composition. By way of example, the composition can be heated to a temperature in a range of about 550° F. to about 800° F., e.g., in a range of about 580° F. to about 780° F., or in a range of about 600° F. to about 700° F.

In some embodiments of the above method, the citrate compound can be a citrate salt, such as a calcium citrate, a potassium citrate, a zinc citrate or combinations thereof. In some embodiments of the above method, the composition that is subjected to heating can include, in addition to talc and a citrate compound blended with a base polymer, a nucleating agent, such as PTFE, that is also blended with the base polymer. Some examples of such compositions can further optionally include Aclyn wax.

Further, in some embodiments of the above method, the concentration of the base polymer in the composition can be, for example, in a range of about 50% to about 98.5% by weight, the concentration of the talc can be, for example, in a range of about 0.3% to about 30% by weight, and the concentration of the citrate compound can be, for example, in a range of about 0.01% to about 1% by weight. In embodiments in which a nucleating agent, such as PTFE, is incorporated in the composition, the concentration of the nucleating agent can be, for example, in a range of about 0.1% to about 5%, e.g., 0.3% to about 5%.

A variety of polymers, such as those listed above, can be used in the above method. By way of example, the polymer can be a fluoropolymer, e.g., a perfluoropolymer, or an engineered resin. Some examples of suitable polymers include, without limitation, tetrafluoroethylene/perfluoromethylvinyl ether copolymer (MFA), hexafluoropropylene/tetrafluoroethylene copolymer (FEP), perfluoroalkoxy (PFA), and perfluoroalkoxyalkane, polyphenylenesulfide (PPS), polyetherimide (PSU), polyphenylsulfone (PPSU), polyethersulfone (PES/PESU), polyetheretherketone (PEEK), polyaryletherketone (PAEK), polyetherketoneketone (PEKK), polyetherketone (PEK), and combinations thereof.

In a related aspect, a foamed article for use in a communications cable is disclosed, which has a foam rate of at least about 30%, or at least about 40%, or at least about 50%, or at least about 60%, or at least about 70%. In some embodiments, such a foamed composition includes cellular structures having a size in a range of about 0.5 mils (0.0005 inches) to 5 mils (0.005 inches). In some such embodiments, at least about 50%, or at least about 60%, or at least about 70%, or at least about 80%, or at least about 90%, or all of the cellular structures have a closed structure. By way of example, the foamed article can be a separator suitable for use in a communications cable, which includes a central portion and a plurality of arms extending from the central portion to provide a plurality of channels for receiving media. While in some embodiments, the separator can have a preformed structure, in other embodiments, it can be a flexible tape. By way of example, the media can be twisted-pairs of electrical conductors, one or more optical fibers and combinations thereof. In some cases, the media disposed in the channels can be used for both data and power transmission. For example, the media can include twisted pairs of electrical conductors capable of carrying at least about 1 watt, or at least about 10 watts, or at least about 20 watts of power, e.g., in a range of about 20 watts to about 200 watts (e.g., the twisted pairs can be twisted copper pairs having an American Wire Gauge (AWG) in a range of 8 to 28 gauge, e.g., 18, 22, or 23 gauge). In some embodiments, the transmission media can include electrical conductors suitable for carrying both data and power as well as one or more optical fibers.

In some embodiments, the chemically foamable pellets according to the present teachings can be tube extruded, semi-pressure extruded or pressure extruded, e.g., over 8 Awg to 28 Awg (e.g., in a range of 16 to 22 AWG) copper wire based on a phase change of the melt viscosity attributable to the combination of the chemical foaming agents (e.g., a combination talc and citrate) present in the pellets, therefore lowering the pressure of the extrudate below 3,500 psi and in some cases, below 2,500 psi.

In a related aspect, the present teachings provide a process for fabricating a foamed article, which comprises subjecting a melted polymer (or a mixture of two or more melted polymers) to pressure extrusion to form the foamed article. In some such embodiments, the melted polymer (or polymeric mixture) is extruded, e.g., through a die, while being subjected to a pressure in a range of about 2500 psi and about 4500 psi. In many such embodiments, the pressure of the extrudate is maintained below about 3,500 psi. A variety of polymers can be employed in such a process, including a variety of fluoropolymers and engineered resins. By way of example, in some such embodiments, the fluoropolymer can be a perfluoropolymer, such as MFA, FEP or PFA. Further, some examples of suitable engineered resins include, without limitation, perfluoroalkoxyalkane, polyphenylenesulfide (PPS), polyetherimide (PSU), polyphenylsulfone (PPSU), polyethersulfone (PES/PESU), polyetheretherketone (PEEK), polyaryletherketone (PAEK), polyetherketoneketone (PEKK), polyetherketone (PEK), and combinations thereof.

In some embodiments, the compositions and processes according to the present teachings can be employed to form foamed insulation over a variety of wires. For examples, in some embodiments, the compositions and the processes according to the present teachings can be used to form insulation over communication cables (e.g., CMP, CMR, or CM); power limited cables (e.g., CL3P, CL2P, CL3R, CL2R, CL3, or CL2); fire alarm cables (FPLP, FPLR, or FPL); optical fiber cables and tubing (e.g., OFNP, OFCP, OFNR, OFCR, OFN, OFC); cable antenna and radio distribution (CATVP, CATVR, and CATV) as well as combination of hybrid optical fiber/copper designs.

In some embodiments, a cable for transmission of electrical power and data is disclosed, which includes a foamed separator providing a plurality of channels for receiving transmission media, such as, electrical wires and optical fibers. The separator can take a variety of different shapes, such as a cross shape. In some embodiments, the separator can be flexible tape. In some embodiments, the separator can be foamed (i.e., it can have a plurality of cellular structures (e.g., cavities) distributed therein) with a foaming rate (i.e., a ratio of volume of cellular structures distributed through the separator relative to the volume of the separator) greater than about 40%, e.g., in a range of about 50% to about 70%, e.g., in a range of about 60% to about 70%. In some embodiments, at least one electrical wire that is capable of carrying electrical energy as well as communications data is disposed in one of the channels. In some embodiments, such an electrical wire can have an AWG in a range of 8 to 28, e.g., in a range of 16 to 28, e.g., 18, 22, or 23. Further, in some embodiments, such an electrical wire can carry a current in a range of about 0.5 Amp to about 1 Amp and electrical power up to about 200 watts, e.g., in a range of about 10 watts to about 200 watts. In some such embodiments, the insulation of the electrical wire can be foamed, e.g., with a foaming rate of at least about 50%, e.g., in a range of about 50% to about 70%. The separator and the insulation can be formed using a variety of fluoropolymers and engineered resins, such as those disclosed herein. In some such embodiments, in another channel, an optical fiber can be disposed, for example, for transmission of communications data via light pulses. A polymeric jacket can surround the separator and the transmission media disposed in the channels provided by the separator. In some embodiments, the jacket can be foamed, e.g., with a foaming rate equal to or greater than about 30% (e.g., in a range of about 30% to about 50%). Similar to the separator and the wire insulation, the jacket can be formed of a variety of fluoropolymers and engineered resins, such as those disclosed herein.

In a related aspect, a cable is disclosed, which comprises a separator providing a plurality of channels for receiving one or more transmission media, said separator comprising a plurality of cellular structures distributed therein at a foam rate of at least about 40%, at least one electrical conductor disposed in one of said channels, said electrical conductor configured for transmission of both communication data and electrical power, at least one optical fiber disposed in one of the other channels, and a jacket surrounding said separator, said at least one electrical conductor, and said at least one optical fiber.

In some embodiments of the above cable, the separator exhibits a foam rate of at least about 40%, e.g., in a range of about 60% to about 70%. Further, in some embodiments, the electrical wire can include a foamed electrical insulation having a foam rate of at least about 35%, e.g., in a range of about 35% to about 60%. Further, in some embodiments of the above cable, the jacket can include a plurality of cellular structures distributed therein at a foam rate of at least about 30%, e.g., in a range of about 30% to about 50%.

Further understanding of the invention can be obtained by reference to the following detailed description in conjunction with the associated drawings, which are described briefly below.

DETAILED DESCRIPTION

The present invention generally provides foamable polymeric compositions, which can be used to form a variety of articles, such as components of communications cables. In particular, it has been discovered that the use of talc together with a citrate compound, such as a citrate salt, in a polymeric composition can advantageously provide enhanced foaming of the polymeric composition for fabricating a variety of foamed articles. In other words, it has been discovered that talc and the citrate compound can act synergistically to provide enhanced foaming. In some embodiments, the compositions according to the present invention are in the form of a plurality of pellets.

Various terms are used herein according to their ordinary meanings. For additional clarity, the following terms are further defined below.

The term "talc" as used herein refers generally to natural or synthetic hydrated magnesium silicate compounds. In some embodiments, talc mineral comprises magnesium hydrosilicate represented by the formula: $3MgOSiO_2H_2O$, where in some cases $SiO_2$ is about 64.5 weight percent, MgO is about 31.9 weight percent and $H_2O$ is about 4.75 weight percent. In some cases, talc can include other minerals such as magnesite, chlorite, magnetite, carbonate, and dolomite.

The term "engineered resin" or "engineered polymer" as used herein refers to any of the following polymers: polyphenylenesulfide (PPS), polyetherimide (PEI), polysulfone (PSU), polyphenylsulfone (PPSU), polyethersulfone (PES/PESU), polyetheretherketone (PEEK), polyaryletherketone (PAEK), polyetherketoneketone (PEKK), polyetherketone (PEK), or polyolefins such as polyethylene (PE), polypropylene (PP), cyclic olefin copolymer (COC), polycarbonate (PC), polyphenylene ether (PPE), liquid crystal polymer (LCP), and/or combinations thereof.

The term "about" as used herein is intended to indicate a variation of at most 10%.

The term "foamed article" as used herein refers to an article of manufacture that includes a plurality of cellular structures.

The term "foam rate," or "foaming rate" are used herein interchangeably and refer to the ratio of the volume of cells in a cellular structure, e.g., a cellular separator, relative to the total volume of the structure.

Figure 1:
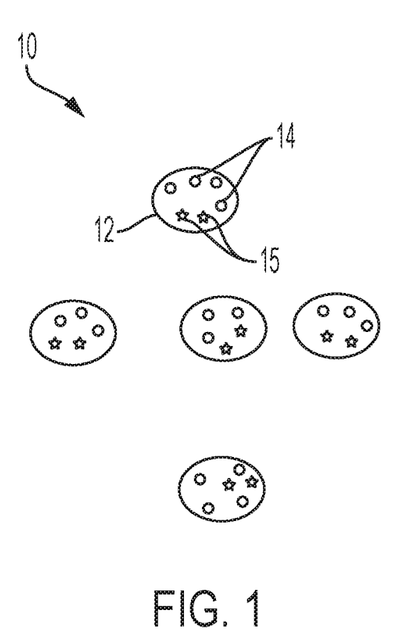
FIG. 1 schematically depicts a plurality of pellets according to an embodiment of the invention.

With reference to FIG. 1, in some embodiments, the present invention provides a plurality of pellets 10, each of which includes a base polymer 12 as well as talc 14 and a citrate compound 16, such as a citrate salt, distributed through the polymer. In some embodiments, the talc can have a weight concentration in a range of about 0.3% to about 30%. By way of example, the talc can be present in the composition, e.g., in the pellets 10, at a weight concentration of about 3% to about 20%, or in a range of about 5% to about 15%, or in a range of about 7% to about 10%. Further, in some embodiments, the weight concentration of the citrate compound 16 in the composition, e.g., in the pellets 10, can be in a range of about 0.01% to about 1%, or in a range of about 0.02% to about 0.9%, or in a range of about 0.03% to about 0.8%, or in a range of about 0.04% to about 0.7%, or in a range of about 0.05% to about 0.6%, or in a range of about 0.06% to about 0.5%. Further, the weight concentration of the base polymer in the composition, e.g., the pellets 10, can be, for example, in a range of about 40% to about 98.5% by weight, e.g., in a range of about 50% to about 95%, or in a range of about 60% to about 85%, or in a range of about 50% to about 75%.

A variety of polymers can be employed as the base polymer. Some examples of suitable polymers include, without limitation, fluoropolymers, such as perfluoropolymers, engineered resins, etc. Some specific examples of suitable polymers include, without limitation, tetrafluoroethylene/perfluoromethylvinyl ether copolymer (MFA), hexafluoropropylene/tetrafluoroethylene copolymer (FEP), perfluoroalkoxy (PFA), and perfluoroalkoxyalkane, and combinations thereof. Some other examples of suitable polymers include, without limitation, polyphenylenesulfide (PPS), polyetherimide (PSU), polyphenylsulfone (PPSU), polyethersulfone (PES/PESU), polyetheretherketone (PEEK), polyaryletherketone (PAEK), polyetherketoneketone (PEKK), polyetherketone (PEK), and combinations thereof.

In some embodiments, the citrate compound can be a citrate salt. Some suitable examples of citrate salts include, without limitation, calcium citrate, potassium citrate, zinc citrate and combinations thereof.

The combination of the talc and the citrate compound advantageously allows enhanced foaming of the pellets 10. By way of example, pellets containing a combination of talc and a citrate salt according to the present teachings can be foamed at a much higher rate than similar pellets with only talc as the foaming agent. By of example, in some embodiments, a pellet according to the present teachings can be foamed at a foaming rate of at least about 30%, or a at least about 35%, or at least about 40%, or at least about 45%, or at least about 50%, or at least about 55%, or at least about 60%, or at least about 65%, or at least about 70%.

In some embodiments, the foaming of the compositions according to the present teachings can result in a foamed article, such as a separator suitable for use in a communications cable, which includes a plurality of cellular structures distributed therein. In some embodiments, at least about 50%, or at least about 60%, or at least about 70%, or at least about 80%, or at least about 90%, or all of the cellular structures can be in the form of closed cells. Further in some embodiments, such cellular structures can have a maximum size in a range of about (0.5 mils to 5 mils, i.e., 0.0005 inches to 0.005 inches).

Figure 2:
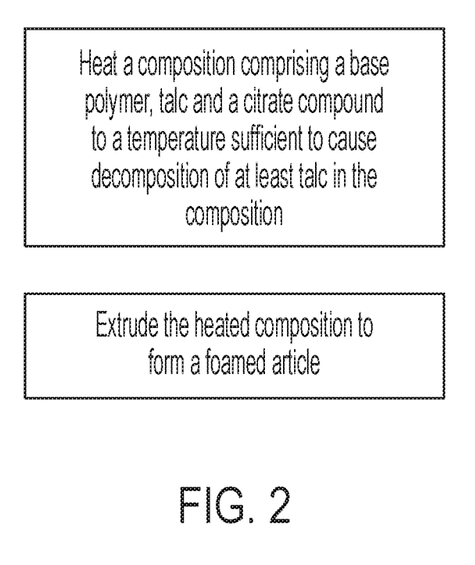
FIG. 2 is a flow chart depicting various steps in a method for generating a foamed article in accordance with the present invention.

With reference to the flow chart of FIG. 2, in a related aspect, a process for fabricating a foamed article is disclosed, which includes heating a composition comprising a base polymer, talc blended with said base polymer, and a citrate compound blended with said base polymer to a temperature sufficient to cause decomposition of at least the talc so as to generate a gas for foaming the composition. By way of example, the composition can be heated to a temperature of at least about 600° F., or at least about 610° F., or at least about 620° F., or at least about 630° F. or at least about 640° F. In some embodiments, the heated composition can be extruded to form a foamed article, such as a foamed separator for use in a communications cable. In some such embodiments, pressure extrusion is employed for fabricating the foamed article, as discussed in more detail below.

In some embodiments of the above method, the citrate compound can be, for example, a citrate salt. Some examples of citrate salts suitable for use in the above method include, without limitation, calcium citrate, potassium citrate, zinc citrate, and combinations thereof. The concentration of any of talc and the citrate compound can be any of those discussed above. Further, a variety of polymers, such as those discussed above, can be used in the above composition that is heated, as discussed above, to form a foamed article.

Figure 3:
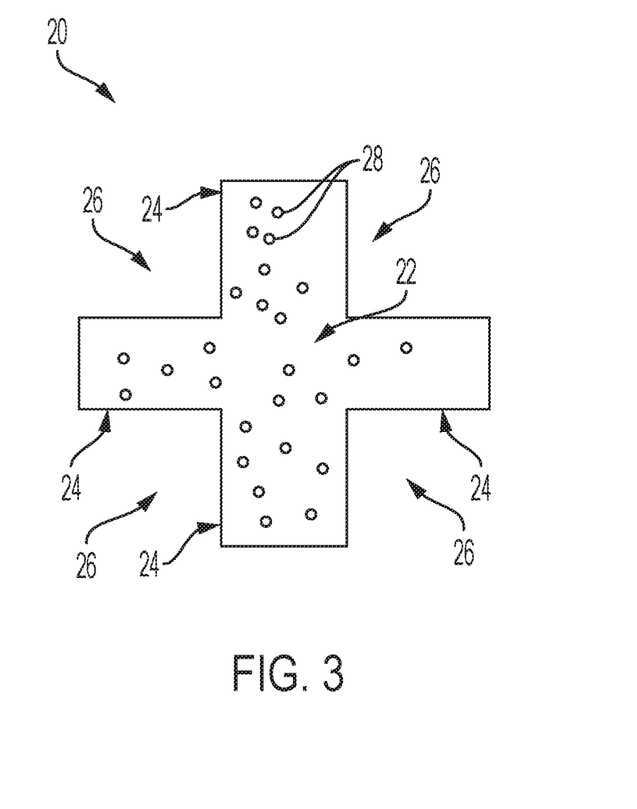
FIG. 3 is a schematic front view of a foamed article, a separator, according to an embodiment of the present invention, FIG. 4 schematically depicts a foamed cable jacket according to an embodiment of the present invention, FIG. 5 schematically depicts an insulated conductor having a foamed insulation according to an embodiment of the present invention, FIG. 6 schematically depicts a plurality of pellets according to an embodiment of the invention, where each pellet includes a base polymer, talc, and a citrate compound blended in the base polymer, FIG. 7 schematically depicts an extrusion apparatus suitable for use in the practice of various embodiments for fabricating foamed articles using polymers according to the present teachings, FIG. 8 schematically depicts a pressure extrusion apparatus suitable for use in the practice of some embodiments for fabricating foamed articles using polymers according to the present teachings, and FIG. 9 schematically depicts a cable according to an embodiment of the present teachings, which can be used for transmission of electrical power and communication data.

FIG. 3 schematically depicts a foamed article 20, in the form of a separator suitable for use in a communications cable, which is formed using methods according to the present invention. The separator 20 includes a central portion 22 from which a plurality of arms 24 extend, which provide a plurality of channels 28 in which a variety of media, such as insulated twisted copper pairs, can be disposed. The separator 20 can be formed of a polymer, such as those discussed above, in which a plurality of cellular structures are distributed. In this embodiment, the cellular structures are in the form of gas-filled cavities. In some embodiments, the maximum size of these cellular structures, e.g., the diameter of the cellular structures when they have a spherical form, can be, for example, in a range of about (0.5 to 5 mil, i.e., 0.0005 to 0.005 inches).

In some embodiments, the volume of the cellular structures is at least about 40%, or at least about 50%, or at least about 60%, or at least about 70% of the volume of the separator. Further, in some embodiments, at least about 40%, or at least about 50%, or at least about 60%, or at least about 70% of the cellular structures can be in the form of closed cells.

Figure 4:
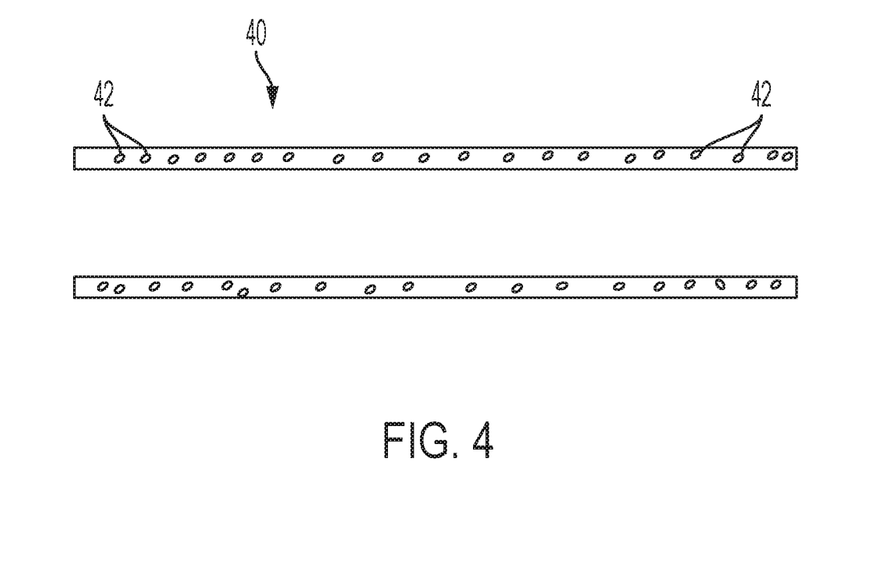

FIG. 4 schematically depicts a cable jacket 40 formed using the methods according to the present invention. The cable jacket 40 can be used to surround internal components of a cable, such as a separator (e.g., the above separator 20), and one or more media (e.g., twisted copper pairs). The jacket 40 can be formed of a polymer, such as those discussed above, in which a plurality of cellular structures 42 are distributed. In this embodiment, the cellular structures are in the form of gas-filled cavities. In some embodiments, the maximum size of these cellular structures, e.g., the diameter of the cellular structures when they have a spherical form, can be, for example, in a range of about (0.5 to 5 mils, i.e., 0.0005 to 0.005 inches). In some embodiments, the cable jacket 40 can exhibit a foaming rate of at least about 30%, e.g., in a range of about 35% to about 50%.

Figure 5:
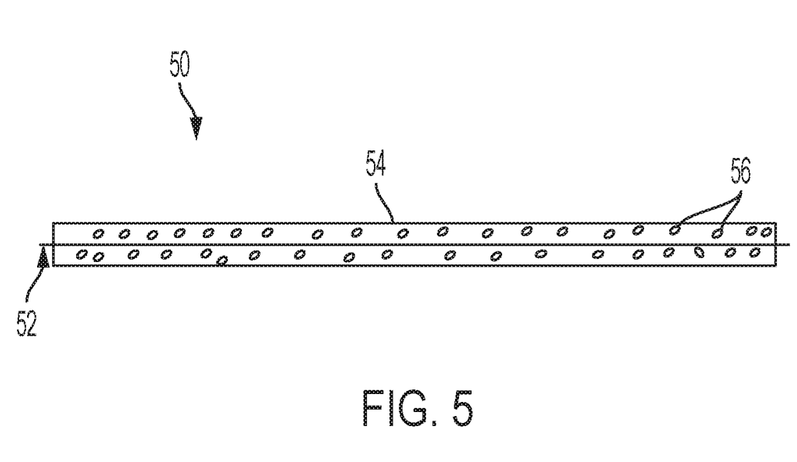

FIG. 5 schematically depicts an insulated conductor 50, e.g., an insulated copper wire, having a central conductor 52 covered by an insulation 54. In this embodiment, the insulation is formed according to the present teachings and includes a plurality of cellular structures 56. More particularly, in this embodiment, the insulation 54 can be formed of a polymer, such as those discussed above, in which the plurality of cellular structures 56 are distributed. In this embodiment, the cellular structures are in the form of gas-filled cavities. In some embodiments, the maximum size of these cellular structures, e.g., the diameter of the cellular structures when they have a spherical form, can be, for example, in a range of about (0.5 to 5 mils, i.e., 0.0005 to 0.005 inches). In some embodiments, the insulation 54 can exhibit a foaming rate of at least about 35%, e.g., in a range of about 35% to about 60%.

Figure 6:
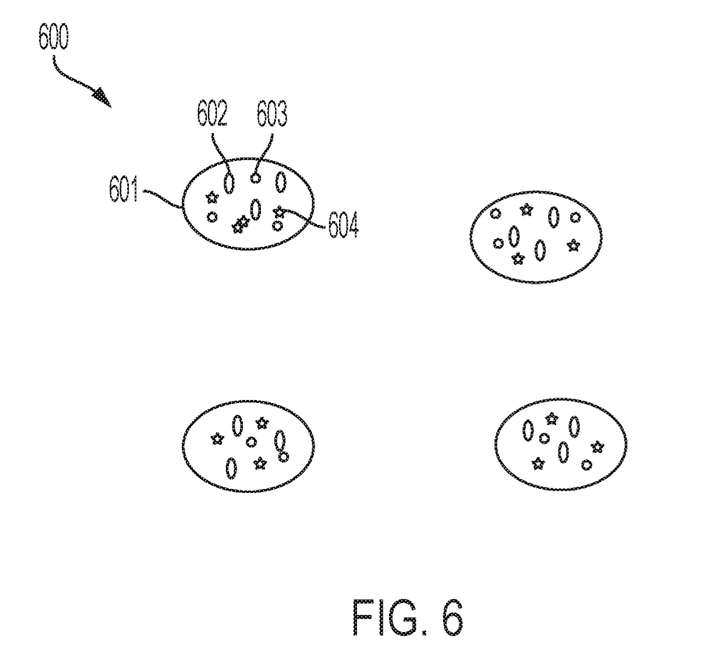

As noted above, in some embodiments, a composition according to the present teachings can include a base polymer, talc, a citrate compound as well as a nucleating agent, such as PTFE. For example, FIG. 6 schematically depicts a plurality of pellets 600, each of which includes a base polymer 601, talc 602, a citrate compound 603 and a nucleating agent 604, e.g., PTFE or $TiO_2$, distributed throughout the base polymer. In some such embodiments, the concentration of the base polymer by weight can be, for example, in a range of about 75% to about 99%, the concentration of the talc by weight can be in a range of about 0.05% to about 30%, the concentration of citrate compound by weight can be in a range of about 0.05% to about 3%, and the concentration of the nucleating agent by weight can be in a range of about 0.1% to about 3%. Further, in some such embodiments, a synthetic wax that is a low molecular weight ionomer, such as Aclyn wax can be added to the composition, e.g., in a weight concentration in a range of about 0.05% to about 2%.

As noted above, in some embodiments, the foamable compositions according to the present teachings can be heated and extruded to fabricate a variety of foamed articles, such as separators and wire insulations.

Figure 7:
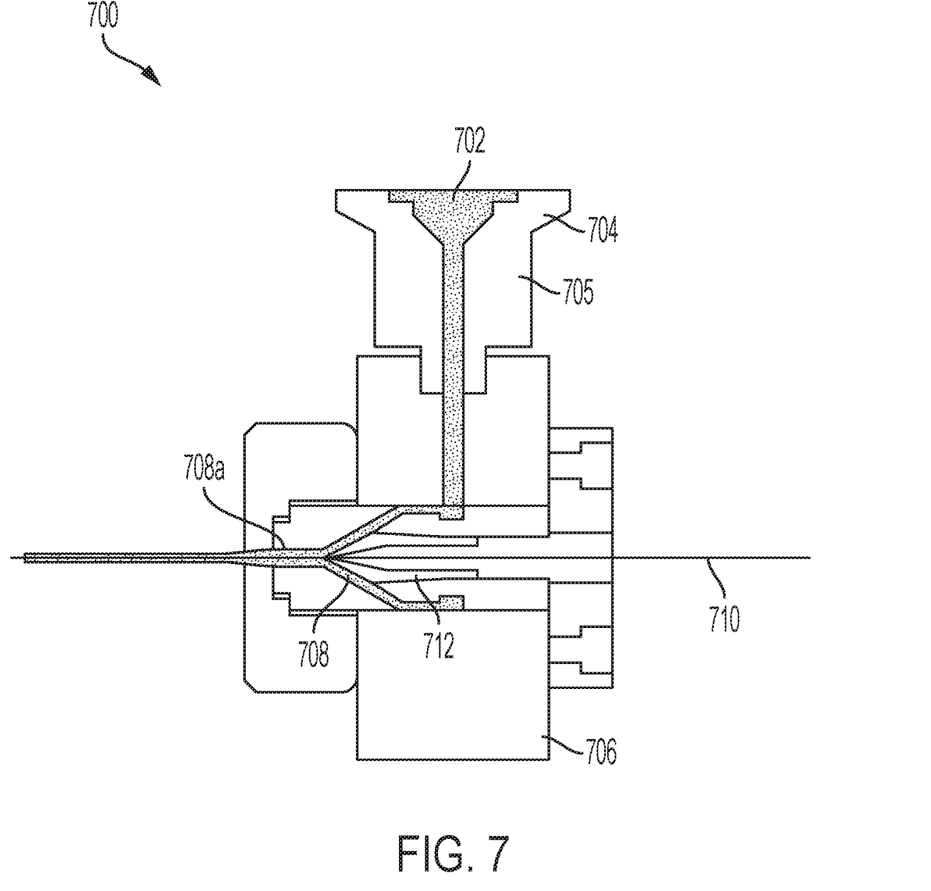

By way of example, FIG. 7 schematically depicts a cross-head 700 of an extrusion apparatus that can be used to extrude melted polymers. A polymer 702 flows into the cross-head 700 via an extruder (not shown). A clamping surface 704 connects the cross-head to the extruder. The clamping surface 704 is typically heated to a temperature in a range of about 720° F. to about 750° F. A valve section 705 of the cross-head is heated to a temperature in a range of about 730° F. to about 760° F. The cross-head 700 includes a die 706 and an extrusion tip 708, which dictate the thickness of the polymer that coats a defined wire gauge size. The die is typically heated to an elevated temperature in a range of about 730° F. to about 780° F. More specifically, in this embodiment, a wire 710 enters the cross-head through its back and travels through the interior of the cross-head until it meets the polymer. A rotating screw 712 pushes the polymer through the cross-head to the outlet of the die. The extrusion tip 708 extends to the outlet of the die 706. In particular, the tip 708 has a land 708a in the form of a cylindrical section of metal that extends the extrusion tip to the outlet of the die. As a result, the melted polymer coats the wire outside of the die. Consequently, there is a significant reduction in process pressure as the coating of the wire with the melted polymer is carried out.

Figure 8:
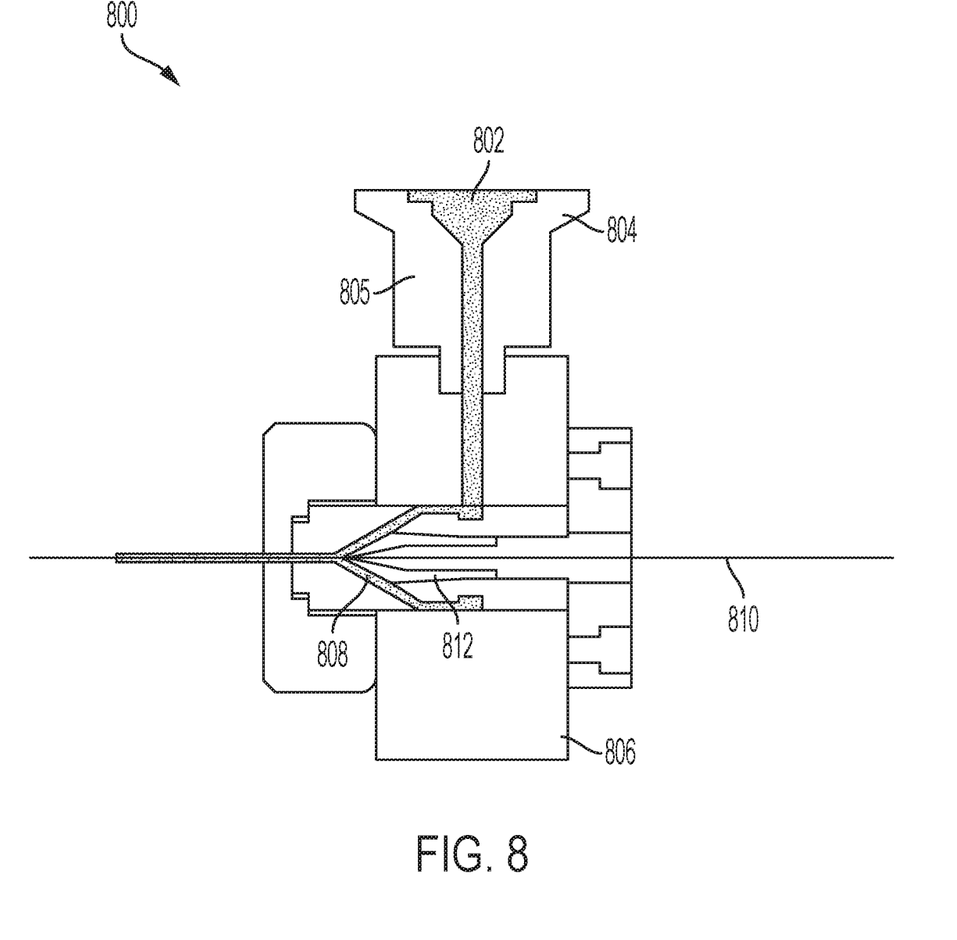

In some embodiments, a plurality of different types of foamed articles can be fabricated by subjecting a composition according to the present teachings to pressure extrusion. By way of example, FIG. 8 schematically depicts a cross-head 800 of a pressure extrusion device. A polymer 802 flows into the cross-head 800 via an extruder (not shown). Similar to the cross-head 700, a clamping surface 804 connects the cross-head to the extruder. The clamping surface 804 is typically heated to a temperature in a range of about 720° F. to about 750° F. A valve section 805 of the cross-head is heated to a temperature in a range of about 730° F. to about 760° F. The cross-head 800 includes a die 806 and an extrusion tip 808, which dictate the thickness of the polymer that coats a defined wire gauge size. The die is typically heated to an elevated temperature in a range of about 730° F. to about 780° F. More specifically, in this embodiment, a wire 810 enters the cross-head through its back and travels through the interior of the cross-head until it meets the polymer. A rotating screw 812 pushes the polymer through the cross-head to the outlet of the die. Unlike the previous cross-head 700, in the cross-head 800, the extrusion tip 808 is located behind the die 806 and lacks a tip land. As a result, in the cross-head 800, the wire is coated with the polymer inside of the cross-head and is consequently subjected to a significant build-up of pressure. For example, the pressure to which the polymer is exposed while being coated with the polymer can be in a range of about 2500 to about 4500 psi.

In a related aspect, a pressure extrusion apparatus such as that discussed above can be employed to form a variety of foamed articles, e.g., using fluoropolymers and/or engineered resins as base polymers in which one or more chemical foaming agents are blended. While in some embodiments, the chemical foaming agent can be talc, in other embodiments, other chemical foaming agents can be employed. Some examples of such other chemical foaming agents include, without limitation, magnesium carbonate, calcium carbonate, and magnesium hydroxide. In many such applications, the pressure during extrusion is kept in a range of about 2500 psi to about 4500 psi.

Figure 9:
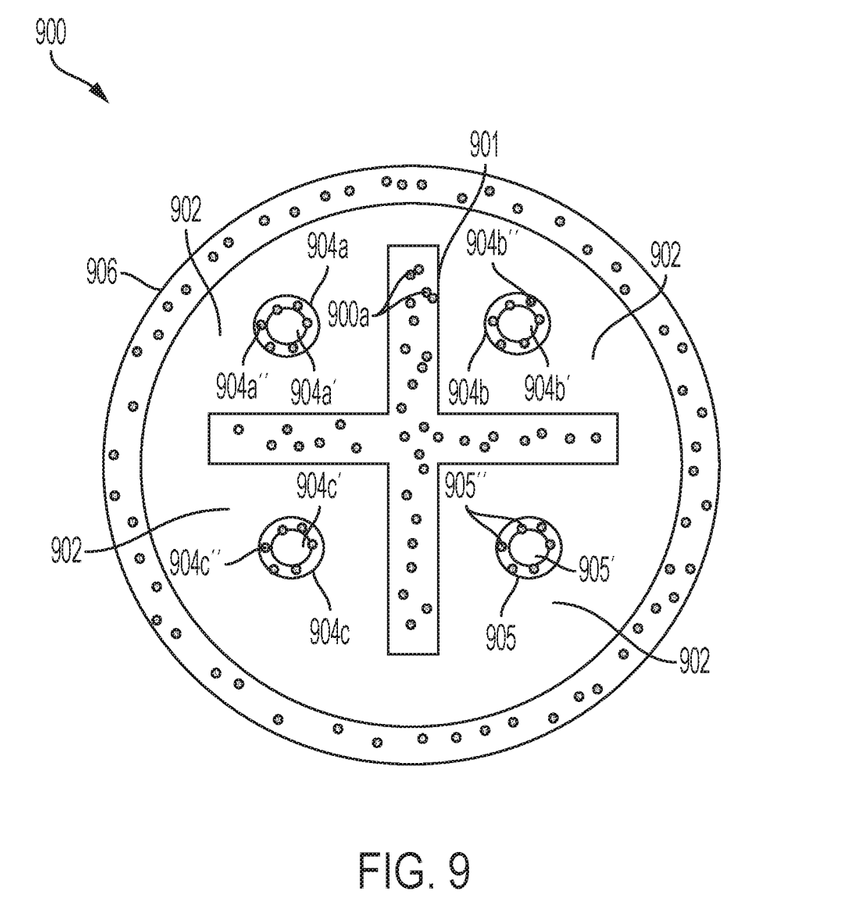

FIG. 9 schematically depicts a cable 900 according to an embodiment of the present teachings, which includes a cross-shaped separator 901 that provides a plurality of channels 902 for receiving transmission media. Electrical wires (e.g., copper wires) 904a, 904b, and 904c are disposed in three of the channels 902 of the separator and an optical fiber 905 is disposed in the remaining channel of the separator. In this embodiment, at least one of the electrical wires, e.g., the wire 904a, is capable of transmitting not only communications data but also electrical power. For example, the wire 904a can have an AWG in a range of about 8 to about 28, e.g., in a range of 16 to 22 (e.g., 18). In some such embodiments, the wire 904a is capable of carrying an electrical current in a range of about 0.5 ampere to about 1 ampere and an electrical power up to about 200 watts, e.g., in a range of about 10 watts to about 200 watts.

A jacket 906 surrounds the separator and the transmission media. In this embodiment, the separator 900 is formed as a foamed polymeric article e.g., using one or more of the polymers disclosed herein, in which a plurality of cellular structures 900a are distributed. In some such embodiments, the separator exhibits a foaming rate of at least about 40%, e.g., in a range of about 50% to about 70%, e.g., in a range of about 60% to about 70%. Each of the wires 904a, 904b, and 904c includes a central conductor 904a', 904b', 904c' surrounded by an insulating layer 904a", 904b", and 904c". In some embodiments, one or more of the insulating layers 904a", 904b", and 904c" are formed as a foamed polymer, such as the polymers disclosed herein. In some such embodiments, such foamed insulating layers can exhibit a foaming rate of at least about 35%, e.g., in a range of about 35% to about 60%. Further, in some embodiments, the jacket 906 can also be formed as a foamed polymeric article, e.g., using one or more of the polymers disclosed herein. In some such embodiments, the jacket 906 can exhibit a foaming rate of at least about 30%, e.g., in a range of about 30% to about 50%. In this embodiment, the optical fiber 905 includes a foamed buffer 905' in which a plurality of cellular structures 905" are distributed. In some embodiments, the foamed buffer 905' exhibits a foam rate in a range of about 30% to about 50%, e.g., in a range of about 35% to about 40%. In some embodiments, the buffer of the optical fiber is formed by using a blend of PEEK (polyether ether ketone) and FEP (e.g., a 50/50 blend by weight).

The cable 900 can be used as a data/communication cable to simultaneously power and communicate with a device. Non-limiting examples of such applications include security cameras, computers, wireless access points, antenna systems or distributed antenna systems (DAS), LED lighting, factory/office automation systems, robotics applications, driverless cars/trucks, HVAC (Heating/Air conditioning) systems, video surveillance cameras, among others.

The following examples are provided for illustrative purposes and are not necessarily indicative of the optimal ways of practicing the invention.

EXAMPLE 1

A blend of FEP polymer with talc and calcium citrate was formed. The concentration of the FEP polymer in the blend was about 94% by weight while the concentrations of talc and calcium citrate in the blend were, respectively, 3.75% and 0.05% by weight. The blend also included Aclyn wax (0.05% by weight). It should be understood that the use of Aclyn wax is optional, and in other cases it may not be employed. The blend was compounded to produce a plurality of pellets.

Another blend of FEP polymer with talc, and without calcium citrate, was also formed. The concentration of the FEP polymer in the blend was about 94% by weight and the concentration of the calcium citrate was about 0.05% by weight. The blend also include Aclyn wax (0.05% by weight).

The pellets containing FEP, talc and citrate, and those containing FEP, and talc without citrate were processed separately using the process parameters indicated in Table 1 below. The processing of the pellets was performed on 1.5 inch high temperature extruder with a general purpose screw with a 26:1 L/D. The various components that make up the blend were mixed together on the line and put directly into the hopper of the extruder.

TABLE 1

| Blend | FEP base polymer + 3.75% talc + 0.5% citrate | FEP base polymer + 3.75% talc |
|---|---|---|
| Diameter (in.) | 0.04 | 0.04 |
| Wire Diameter (in.) | 0.0226 | 0.0226 |
| Die (in.) | 0.185 | 0.185 |
| Tip (in.) | 0.092 | 0.085 |
| DDR | 23:1 | 23:1 |
| DRB | 1.01 | 1.03 |
| Crosshead | Canterbury | Canterbury |

TABLE 1-continued

| Blend | FEP base polymer + 3.75% talc + 0.5% citrate | FEP base polymer + 3.75% talc |
|---|---|---|
| Screen Pack | 20/40/60 | 20/40/60 |
| Screw | General Purpose | General Purpose |
| Zone 1 (F.) | 580 | 580 |
| Zone 2 (F.) | 680 | 680 |
| Zone 3 (F.) | 720 | 720 |
| Zone 4 (F.) | 730 | 730 |
| Clamp (F.) | 730 | 730 |
| Valve (F.) | 730 | 730 |
| Head (F.) | 730 | 730 |
| Die (F.) | 730 | 730 |
| Melt Temperature (F.) | 670 | 670 |
| RPM | 30 | 24 |
| Capstan Setting | 15 | 30 |
| Run Speed (FPM) | 303 | 606 |
| Pressure | 860 | 945 |
| Vacuum | −1.2 | −1.10 |
| Pre-Heat | 34.6 | 45.4 |
| Insulation S.G. | 0.89 | 1.45 |
| Foam Rate | 59% | 32% |
| Avg. Cell Size (in.) | 0.0023 | 0.0009 |
| Air Gap | 6 in | 6 in |

The above results indicate that the use of talc together with citrate results in a much enhanced foam rate relative to using only talc. In particular, a foam rate of 59% was observed for pellets containing both talc and citrate while a foam rate of 32% was observed for pellets containing only talc.

EXAMPLE 2

A foamable composition was formed by blending FEP polymer with talc, calcium citrate, PTFE and Aclyn wax. The concentration of the FEP polymer in the blend was about 96.9% by weight, the concentration of talc was about 1.5 percent by weight, the concentration of calcium citrate was about 0.45 by weight, the concentration of PTFE was about 0.9 percent weight, and the concentration of Aclyn wax was about 0.25 percent by weight.

EXAMPLE 3

A foamable composition was used to coat a 23AWG copper wire using pressure extrusion. The foamable composition included FEP at a weight concentration of about 84%, talc at a weight concentration of about 15%, and Aclyn wax at a weight concentration of about 0.1%. The pressure extrusion was performed on a 38 mm (1.5 inch) 24:1 L/D general purpose single screw extruder. The parameters used for pressure extrusion are listed in the table below:

TABLE 2

| Line Speed (ft/min) | 801 |
|---|---|
| Melt Temperature Pre-Breaker (° F.) | 680 |
| Melt Temperature Post-Breaker (° F.) (through correlation) | 768 |
| Melt Pressure (Psi) | 1385 |
| Wall Thickness (inches) | 0.00955 |
| Wire OD (inches) | 0.0226 |
| Die OD (inches) | 0.042 |
| Gum Space (inches) | 0.25 |
| Clamp Temperature (° F.) | 730 |
| Valve (° F.) | 735 |
| Head (° F.) | 740 |
| Die (° F.) | 740 |

The foamed insulation as well as the extrusion process exhibited a number of advantageous properties. For example, at a thickness of 0.008 inches, consistent with communication insulation wall thicknesses, there were no spark failures, thus meeting the Underwriters Laboratory (UL) test protocol at 1250 volts. The insulation process at 0.008 inches can be run at greater than 800 feet per minute in a pressure extrusion set-up. The extrusion process forms a closed cell on both the inner skin and the outer skin when forming an insulation over a conductor. The foamed insulation exhibited a tensile strength greater than about 2000 psi, an elongation greater than about 150%, and a foam rate of 35%.

EXAMPLE 4

A foamable composition was used to coat a 23AWG copper wire using pressure extrusion. The foamable composition included FEP at a weight concentration of about 96.9%, talc at a weight concentration of about 1.5%, PTFE at a weight concentration of about 0.9%, calcium citrate at a weight concentration of about 0.45%, and Aclyn wax at a weight concentration of about 0.25%. The pressure extrusion was performed on a 38 mm (1.5 inch) 24:1 L/D general purpose single screw extruder with a 0039 die. Two sets of processing conditions were employed as listed in Table 3 below:

TABLE 3

|  | Process 1 | Process 2 |
|---|---|---|
| Melt Temperature | 685° F. | 697° F. |
| RPM (revolutions per minute of screw) | 10 | 10 |
| FPM (feet per minute) | 485 | 662 |

In this example, the foamed insulation exhibited a foam rate of about 45%.

Those having ordinary skill in the art will appreciate that various changes can be made to above embodiments without departing from the scope of the invention.

What is claimed is:

1. A composition, comprising:
   a base polymer,
   talc blended with said base polymer,
   a citrate compound blended with said base polymer,
   a wax blended with said base polymer at a concentration of about 0.1% to about 0.75%,
   wherein a concentration of said talc in said composition is in a range of about 0.3% to about 30% by weight.

2. The composition of claim 1, wherein a concentration of said talc in said composition is in a range of about 2% to about 20% by weight.

3. The composition of claim 1, wherein a concentration of said talc in said composition is in a range of about 3% to about 15%.

4. The composition of claim 1, wherein a concentration of said talc in said composition is in a range of about 5% to about 10%.

5. The composition of claim 1, wherein a concentration of said citrate compound in said composition is in a range of about 0.01% to about 1% by weight.

6. The composition of claim 5, wherein a concentration of said citrate compound in said composition is in a range of about 0.02% to about 0.9% by weight.

7. The composition of claim 5, wherein a concentration of said citrate compound in said composition is in a range of about 0.03% to about 0.8% by weight.

8. The composition of claim 5, wherein a concentration of said citrate compound in said composition is in a range of about 0.04% to about 0.7% by weight.

9. The composition of claim 5, wherein a concentration of said citrate compound in said composition is in a range of about 0.05% to about 0.6% by weight.

10. The composition of claim 1, wherein a concentration of said base polymer is in a range of about 50% to about 98.5% by weight.

11. The composition of claim 1, wherein said base polymer comprises a fluoropolymer.

12. The composition of claim 1, wherein said base polymer comprises a perfluoropolymer.

13. The composition of claim 11, wherein said fluoropolymer comprises any of tetrafluoroethylene/perfluoromethylvinyl ether copolymer (MFA), hexafluoropropylene/tetrafluoroethylene copolymer (FEP), perfluoroalkoxy (PFA), and perfluoroalkoxyalkane, and combinations thereof.

14. A composition, comprising:
a base polymer,
talc blended with said base polymer,
a citrate compound blended with said base polymer, and
a wax blended with said base polymer at a concentration of about 0.1% to about 0.75%, wherein said base polymer comprises any of polyphenylenesulfide (PPS), polyetherimide (PSU), polyphenylsulfone (PPSU), polyethersulfone (PES/PESU), polyetheretherketone (PEEK), polyaryletherketone (PAEK), polyetherketoneketone (PEKK), polyetherketone (PEK), cyclicolefin copolymer (COC), polycarbonate (PC) polyphenylene ether (PPE), liquid crystal polymer (LCP), and/or combination thereof.

15. The composition of claim 1, wherein said citrate compound comprises any of calcium citrate, potassium citrate, zinc citrate and a combination thereof.

16. The composition of claim 1, wherein said composition is in the form of a plurality of pellets.

17. A composition, comprising:
a base polymer,
talc blended with said base polymer,
a citrate compound blended with said base polymer, and
a wax blended with said base polymer at a concentration of about 0.1% to about 0.75%,
further comprising a nucleating agent blended with said base polymer, wherein said nucleating agent comprises any of PTFE (polytetrafluoroethylene), boron nitride, zinc borate, zinc oxide, or titanium dioxide.

18. The composition of claim 17, wherein a concentration of said nucleating agent is in a range of about 0.1% to about 3% by weight.

19. The composition of claim 1, wherein said composition is capable of being tube extruded, semi-pressure extruded or pressure extruded at an extrudate pressure of less than any of 3500 psi or 2500 psi.

* * * * *